Figure 1:
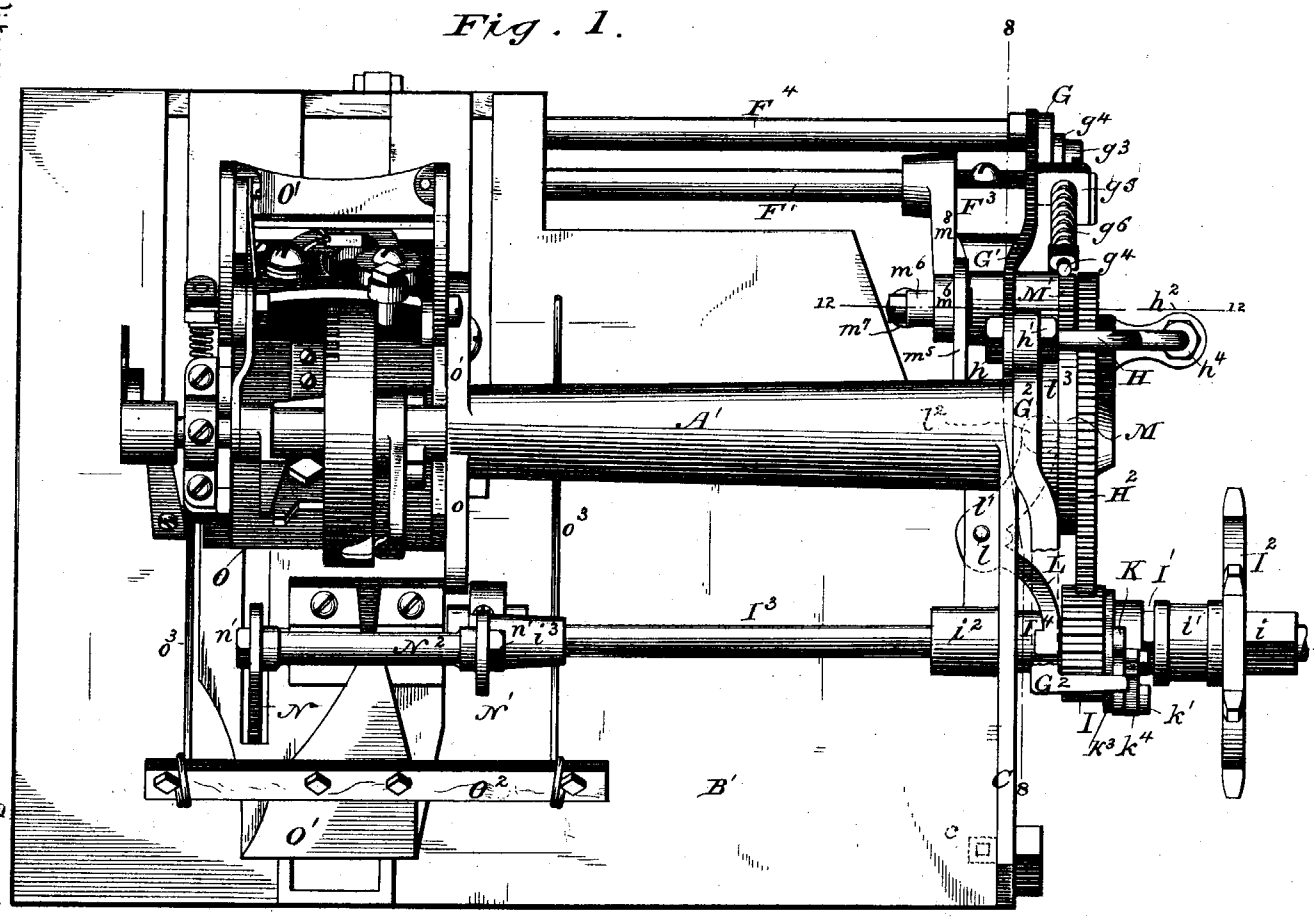

7 Sheets—Sheet 1.

P. P. COLER.

Assignor to the McCORMICK HARVESTING MACHINE COMPANY.

GRAIN BINDER.

No. 11,102. Reissued Aug. 19, 1890.

Witnesses
Geo. W. Young.
Henry A. Lamb.

Inventor
Peter P. Coler.
By his Attorneys
Prescott & Prescott

THE NORRIS PETERS CO., PHOTO-LITHO., WASHINGTON, D. C.

P. P. COLER:

Assignor to the McCormick Harvesting Machine Company.

GRAIN BINDER.

No. 11,102. Reissued Aug. 19, 1890.

Witnesses
Geo. W. Young.
Henry A. Lamb

Inventor
Peter P. Coler.
By his Attorneys
Parkinson & Parkinson

THE NORRIS PETERS CO., PHOTO-LITHO., WASHINGTON, D. C.

P. P. COLER.

Assignor to the McCormick Harvesting Machine Company.

GRAIN BINDER.

No. 11,102. Reissued Aug. 19, 1890.

Witnesses
Geo W Young
Henry A. Laul

Inventor
Peter P. Coler.
By his Attorneys
Parkinson & Parkinson

THE NORRIS PETERS CO., PHOTO-LITHO., WASHINGTON, D. C.

P. P. COLER.

Assignor to the McCormick Harvesting Machine Company.

GRAIN BINDER.

No. 11,102. Reissued Aug. 19, 1890.

Witnesses
Geo. W. Young.
Henry A. Lamb.

Inventor
Peter P. Coler.
By his Attorneys
Parkinson & Parkinson

THE MORRIS PETERS CO., PHOTO-LITHO., WASHINGTON, D. C.

P. P. COLER.

Assignor to the McCormick Harvesting Machine Company.

GRAIN BINDER.

No. 11,102. Reissued Aug. 19, 1890.

Witnesses
Geo. W. Young.
Henry A. Lamb.

Inventor
Peter P. Coler.
By his Attorneys.
Robinson & Robinson

THE NORRIS PETERS CO., PHOTO-LITHO., WASHINGTON, D. C.

P. P. COLER.

Assignor to the McCORMICK HARVESTING MACHINE COMPANY.

GRAIN BINDER.

No. 11,102. Reissued Aug. 19, 1890.

Witnesses
Geo W. Young.
Henry A. Lamb.

Inventor
Peter P. Coler.
By his Attorneys
Parkinson & Parkinson

THE NORRIS PETERS CO., PHOTO-LITHO., WASHINGTON, D. C.

P. P. COLER.
Assignor to the McCormick Harvesting Machine Company.
GRAIN BINDER.
No. 11,102. Reissued Aug. 19, 1890.
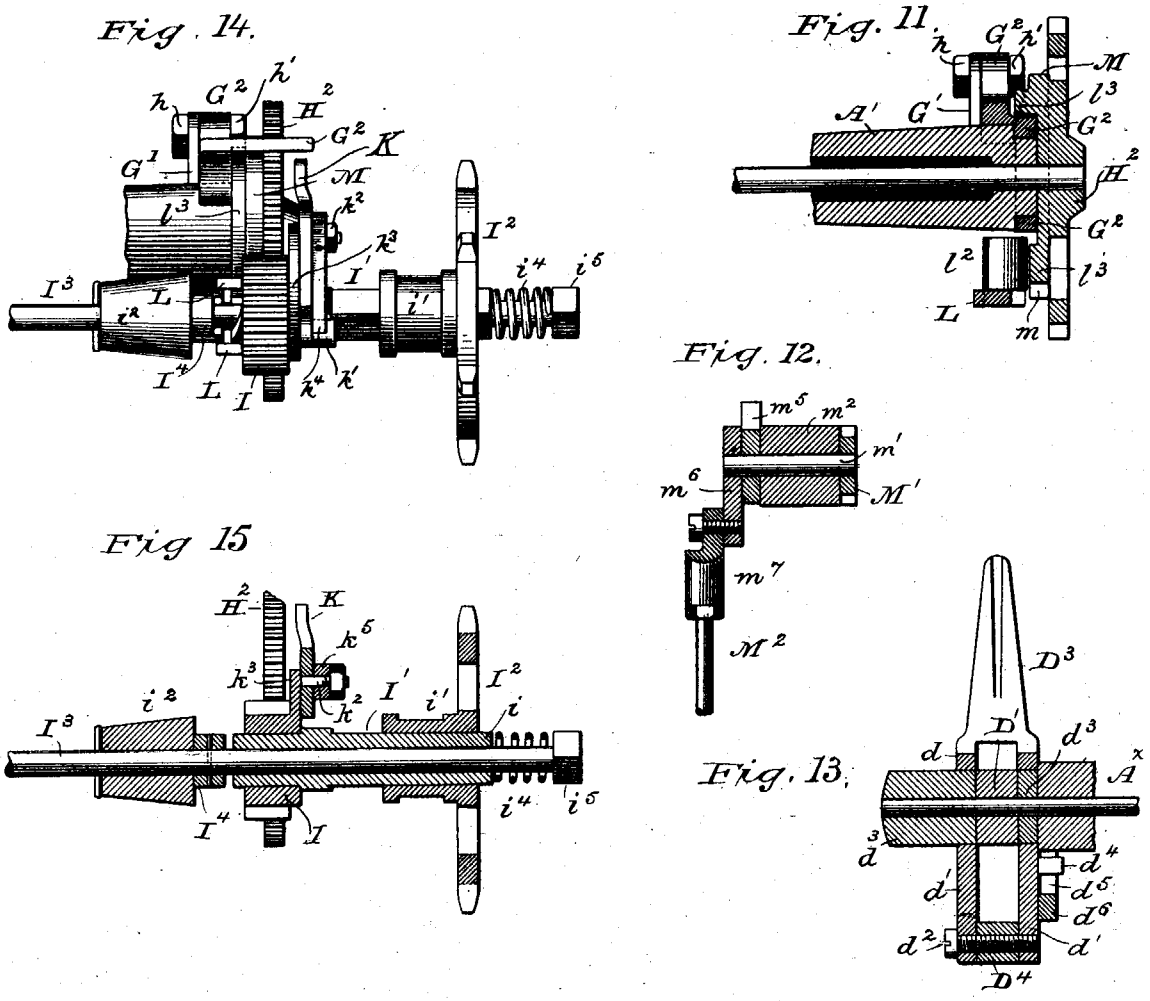
Witnesses
Geo W. Young.
Henry A. Lamb.
Inventor
Peter P. Coler.
By his Attorneys
Parkinson & Parkinson
THE NORRIS PETERS CO., PHOTO-LITHO., WASHINGTON, D. C.

UNITED STATES PATENT OFFICE.

PETER PAUL COLER, OF CLYMAN, WISCONSIN, ASSIGNOR TO THE McCORMICK HARVESTING MACHINE COMPANY, OF CHICAGO, ILLINOIS.

GRAIN-BINDER.

SPECIFICATION forming part of Reissued Letters Patent No. 11,102, dated August 19, 1890.

Original No. 336,895, dated March 2, 1886. Application for reissue filed March 25, 1887. Serial No. 232,423.

*To all whom it may concern:*

Be it known that I, PETER PAUL COLER, a citizen of the United States, residing at Clyman, in the county of Dodge and State of Wisconsin, have invented certain new and useful Improvements in Automatic Grain-Binders, of which the following is a specification.

My invention relates, so far as this present division is concerned, to the tripping mechanism of grain-binders, which sets the binding mechanism in action, and particularly to the so-called "table-trip," which practically represents a central section of the binding-table, hinged at its inner end and connected intermediately with the trip-clutch; and it consists in combining with said table-trip, arranged to actuate the trip-clutch whenever depressed, means whereby it is lifted against the gavel to act as a compressor after the binding mechanism is started.

It further consists in various other combinations and details of construction hereinafter described and claimed.

Figure 2:
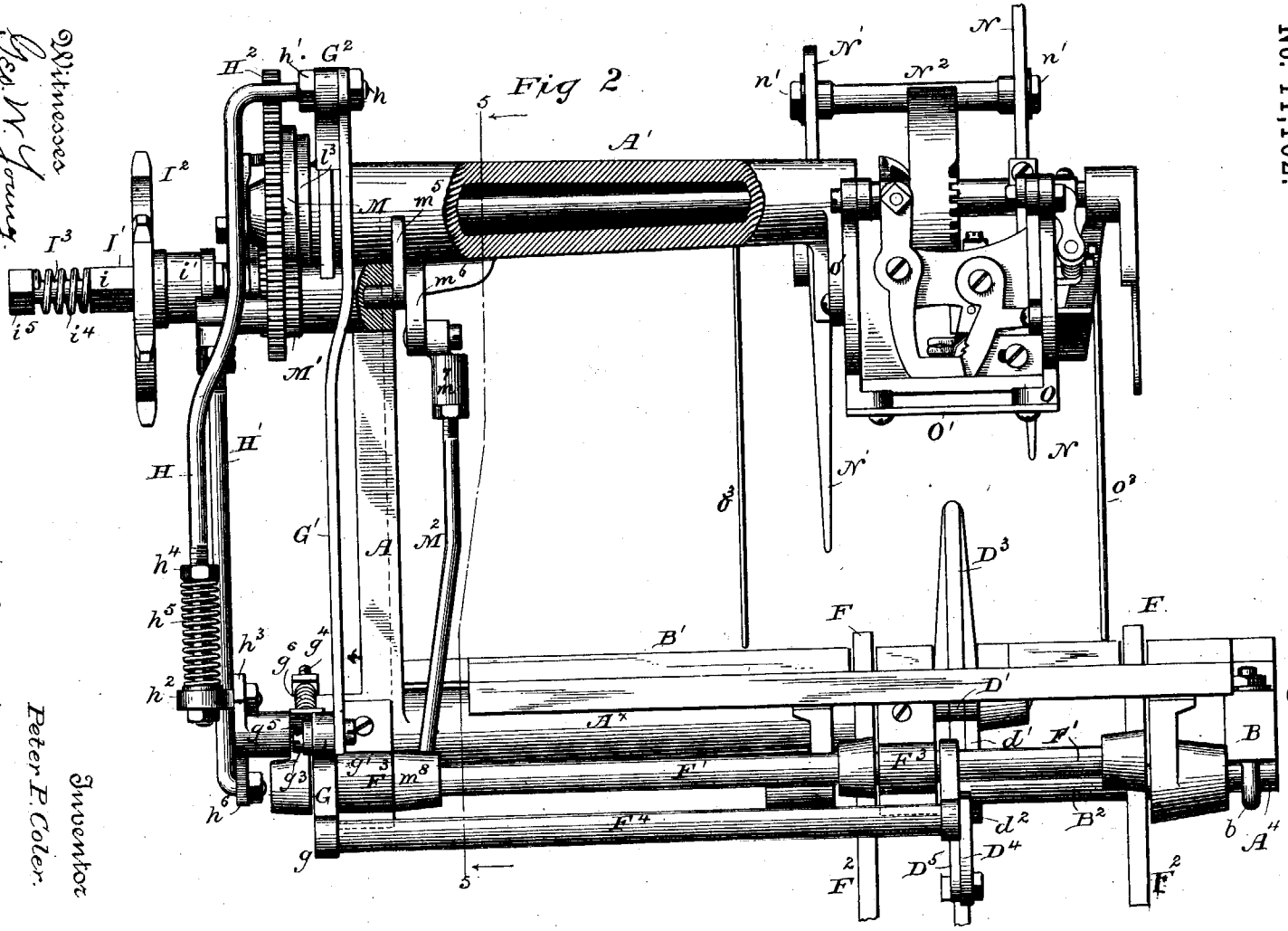
Figure 3:
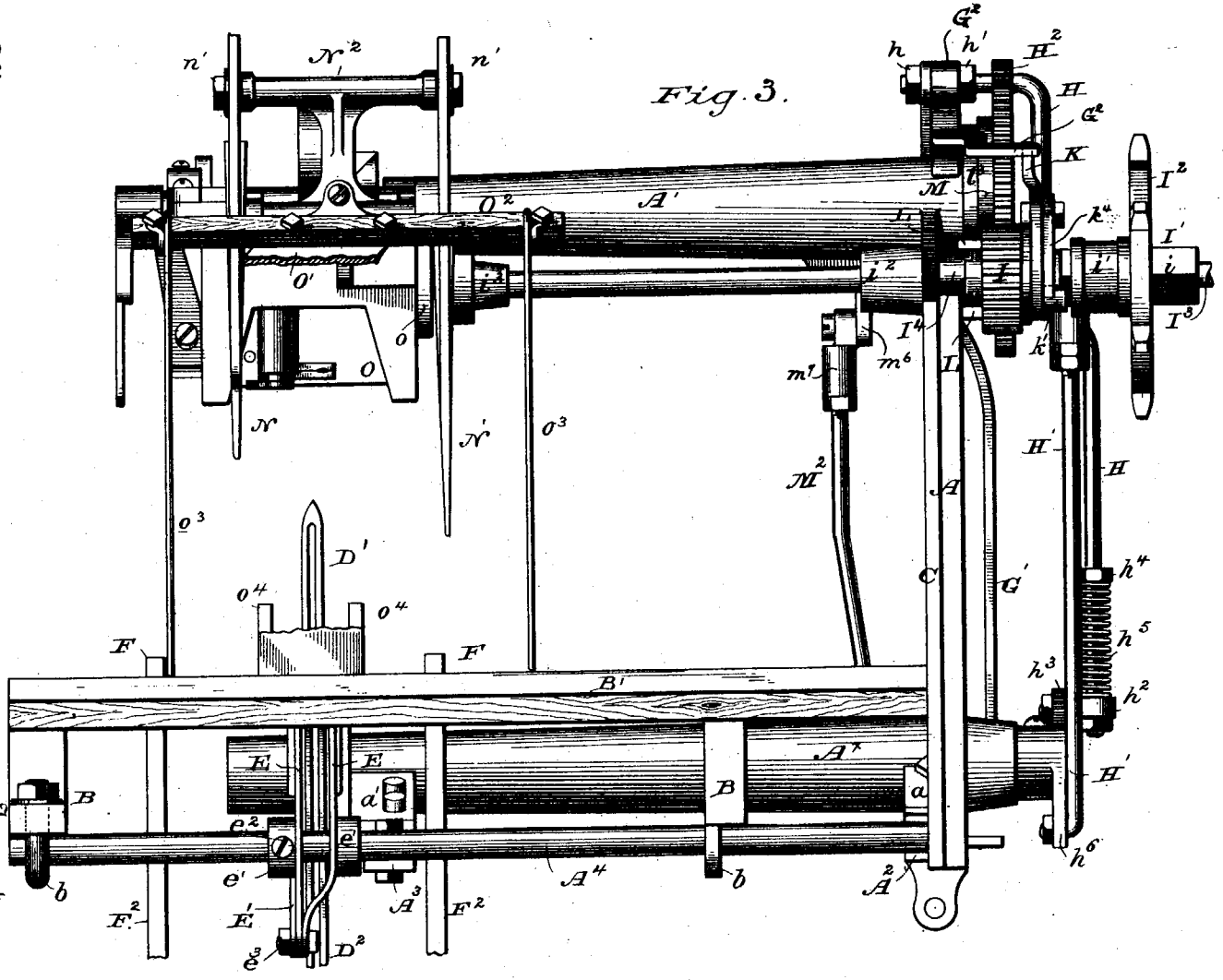
Figure 5:
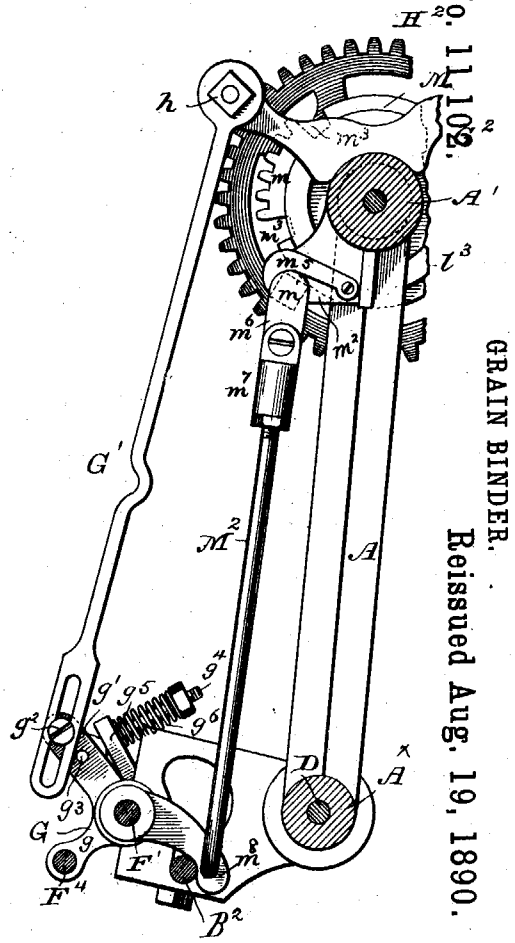
Figure 4:
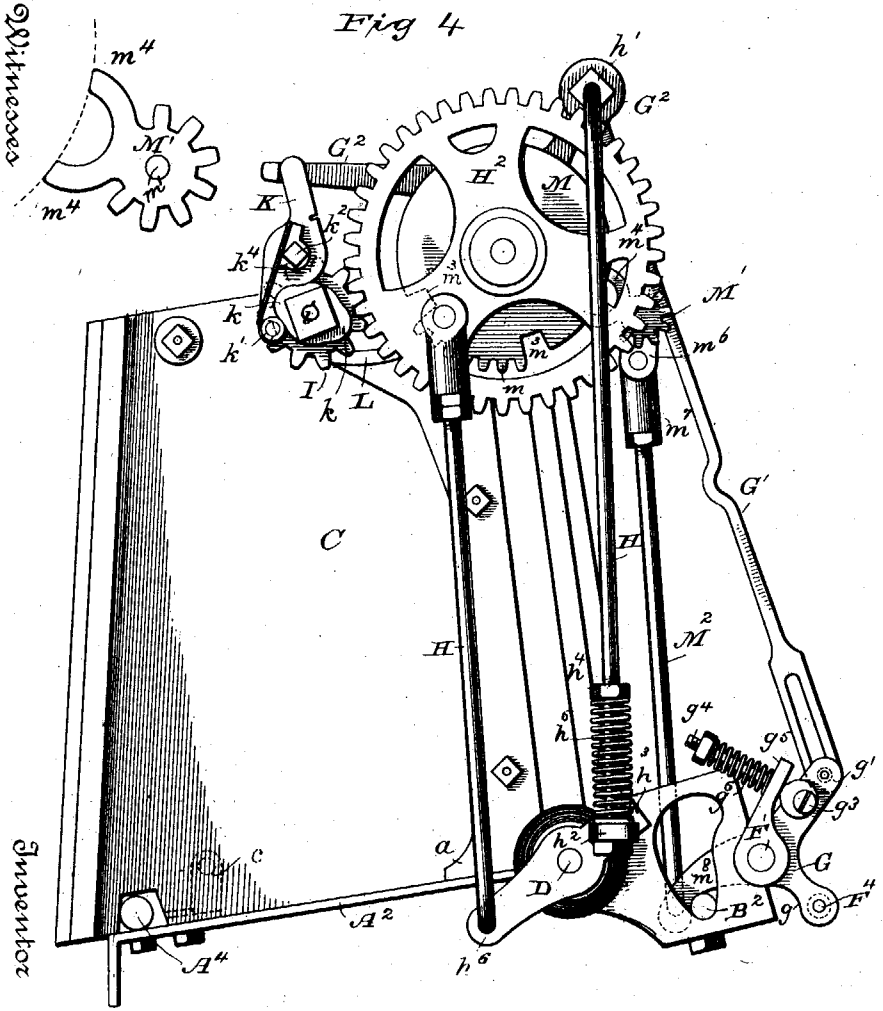
Figure 6:
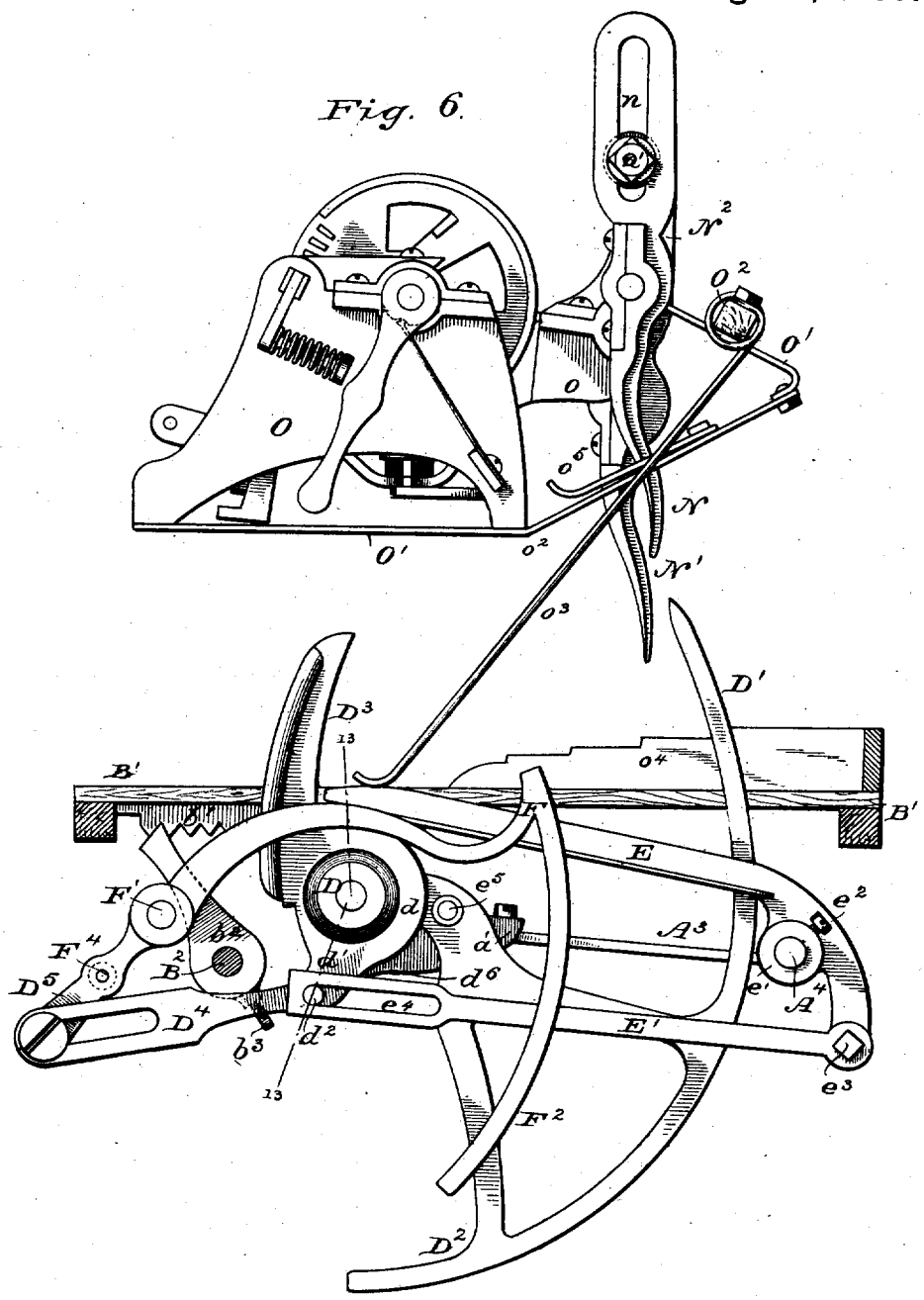
Figure 8:
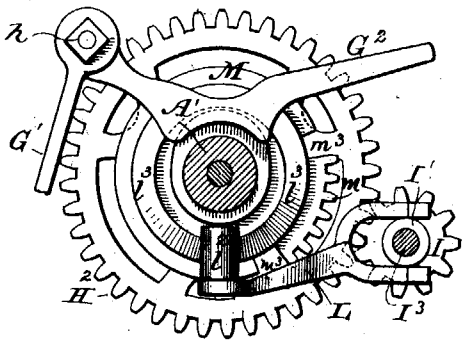
Figure 9:
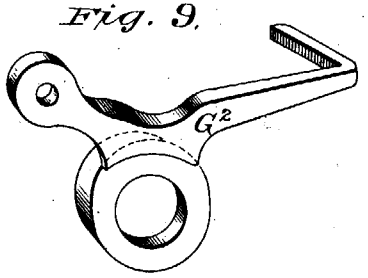
Figure 10:
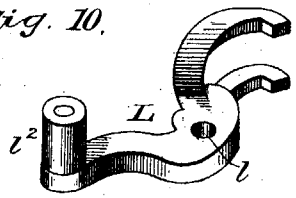
Figure 7:
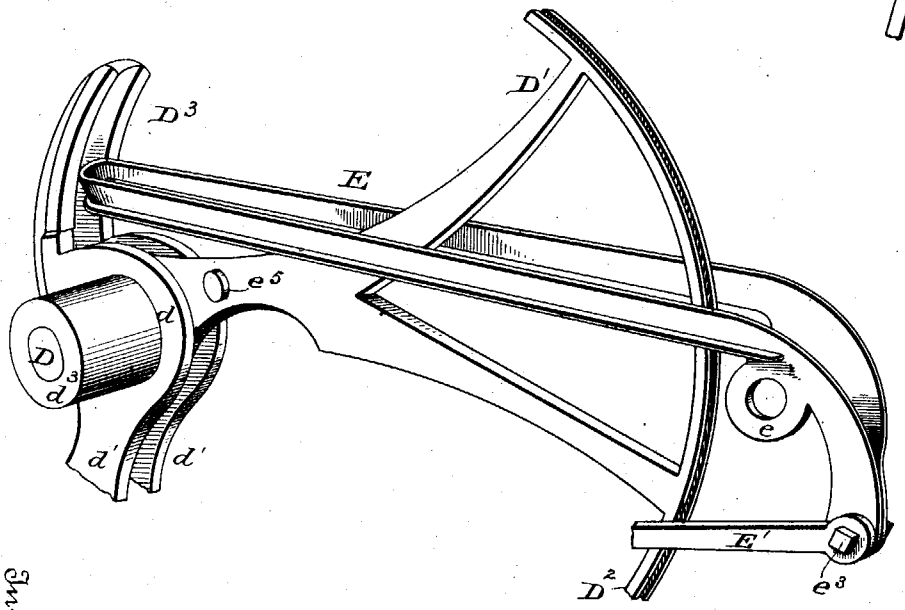

In the drawings, Figure 1 is a top plan view of a grain-binder embodying my improvements; Fig. 2, an elevation thereof from the stubble side; Fig. 3, an elevation from the inner or grain side; Fig. 4, a rear elevation; Fig 5, an elevation in section on the correspondingly-numbered line in Fig. 2, partly broken away and seen from the front; Fig. 6, a front end elevation, the grain-table or decking being in section; Fig. 7, a perspective detail view embracing a portion of the outside tripping and compressing finger, the binder arm or needle, and the table-trip in their relative positions, and the latter represented in full; Fig. 8, a section on the correspondingly-numbered line in Fig. 1, looking from the front; Fig. 9, a perspective view of the trip-latch for throwing the main driving-pinion into and out of effective gear with the tyer-shaft; Fig. 10, a perspective view of the clutch-shipper, which throws the packer-shaft out of connection with the main driving-pinion during the operation of encircling and tying the accumulated gavel; Fig. 11, a longitudinal sectional detail of a portion of the overhanging arm of the main bracket or post-frame inclosing the tyer-shaft and showing the relative positions of the gear by which it is driven, the segment-toothed disk and face-cam on said gear, the trip-latch and packer-clutch shipper; Fig. 12, an enlarged sectional detail on the correspondingly-numbered line in Fig. 1, in explanation of the mechanism for operating the ejectors; Fig. 13, also an enlarged sectional detail on the line indicated by like numerals in Fig. 6; Fig. 14, an enlarged detail in perspective of the trip-clutch and immediately-accessory mechanism for throwing the packers and binding mechanism into and out of action; and Fig. 15 a longitudinal central sectional view thereof.

A represents the post-frame or main bracket of a binding attachment for a harvester formed, as usual nowadays, in a single casting with tubular overhanging arm A′, in which the tyer-shaft takes bearing, and corresponding subtending-arm $A^{\times}$, which incloses the needle-shaft. Bolted to ears or projections *a a′* from this subtending-arm are transverse metal frame bars or girts $A^2$ and $A^3$, the former at the rear of the arm and the latter adjacent to its front end, and to the inner or grain ends of these girts is firmly secured a longitudinal rod or frame-bar $A^4$, corresponding in length to the length of the binder attachment and serving as the means of connection between the binder and harvester-frame. For a purpose made part of the subject-matter of the other division of this reissue, but having no relation to or influence upon the combinations herein sought to be covered, eyebolts *b* embracing this longitudinal rod secure pivotally thereto the inner ends of timbers B, carrying the binder-deck or grain-table B′, the under side of which latter toward the delivery edge is provided with a toothed rack *b′*, that is engaged by a pawl $b^2$, sleeved upon an outer longitudinal frame bar or rod $B^2$, supported from the harvester and secured to the subtending-arm of the post-frame, so that by adjusting this pawl along the rack and securing it against accidental displacement by means of the set-screw $b^3$, passing through its hub and binding against the supporting rod or pivot, the inclination of the binding-table may be altered as deemed expedient.

A wind-board, end plate, or guard C is bolted to a web from the post of the main bracket, and extends thence inwardly along and above the rear metal frame-bar, and at its extreme lower end or corner is steadied and braced by a strap or angle-iron $c$ secured to said bar.

D is the needle-shaft journaled, as already stated, in the subtending-arm of the main bracket, and carrying at its front end beyond said arm and secured in any suitable manner the needle or binder-arm D′, which has the customary concentric guard $D^2$, to cut off incoming grain and make a clean separation as the needle rises, and is provided, as usual, with a groove along its back for the reception of the cord, and with an eye near its point through which said cord runs.

To that end of the needle-shaft which projects beyond the subtending-arm of the post-frame is loosely sleeved the outside tripping and compressing finger $D^3$, having a bifurcated hub $d$, and downwardly-projecting arms or heel-extensions $d'$ therefrom that lie on either side of and embrace the hub of the needle, which latter being keyed to the shaft serves to hold the trip-finger in a fixed position and prevent its having any lateral movement on the shaft. Between the ends of these arms or heel-extensions is pivoted upon a pin $d^2$, uniting them, one end of the link $D^4$, its other end being slotted and connected to a crank-arm $D^5$, hereinafter referred to.

Between the needle-shaft and the hub of the trip-finger are interposed collars $d^3$, which are flush with the hub of the needle. Said collars are keyed to the shaft and form bearings for the trip-finger, which is free to oscillate thereon. One of the downwardly-projecting arms of said trip-finger is provided with a lateral stud $d^4$, which projects into a slot $d^5$ in an ear or projection $d^6$ from the subtending-arm of the main bracket, thereby positively limiting the movement of the finger about its supporting-shaft.

The table-trip E is made of a single strip of metal folded upon itself, forming parallel arms which are united at their outer ends, and near their inner ends are provided with bearings $e$, which embrace the inner longitudinal frame-bar. At each side of the bearings a collar $e'$ is arranged upon the frame-rod, one being fixed and the other adjustable by set-screws $e^2$, such arrangement permitting the ready removal of the table-trip from the rod, and also affording a means for taking up wear. Beyond the bearings the arms are bent or curved downward to bring their leverage below the fulcrum, and are united by a bolt $e^3$ to one end of a link E′, the other end of which is longitudinally slotted, as at $e^4$, and takes over the pin $d^2$, that connects the heel-extensions of the outside trip-finger, thus permitting to both the table-trip and the trip-finger a movement in one direction without necessarily affecting the position of the other, but insuring that the depression of the outer end of the table-trip shall rock the outside trip-finger in the same direction in which it would be rocked by the pressure of the grain against it to cause its effective action. The arms of the table-trip are disposed one upon each side of the binder-arm, the extreme outer end of said table-trip moving just inside of the trip-finger and in a plane that when prolonged passes through said finger. In its normal position its outer end is raised somewhat above the level of the decking, with the intermediate link pressing or pulling against the heel of the trip-finger, so that as the grain accumulates and is packed against the two it may either rock the trip-finger outward by direct pushing thereon, or else press the table-trip downward and thereby draw upon the link and impart to the trip-finger the same outward movement, or else by concurrently pushing upon one and pressing upon the other actuate the tripping mechanism through both at once.

Upon the shank of the binder-arm are laterally-projecting studs carrying anti-friction rollers $e^5$, arranged beneath the arms of the table-trip, but at a sufficient distance therefrom in the position of rest to permit it to yield for the purpose of tripping the binder. These roller-bearing studs strike the forward end of the table-trip in the upward movement of the binding-arm and lift it against the gavel to compress the latter from beneath against the overlying breast-plate.

F are the "kickers" or bundle-ejectors, each of which consists of a curved arm, with one end firmly secured to a shaft F′, while at its outer end it is provided with a backwardly-projecting curved guard $F^2$, movement of the same through the decking being provided for by slots made therein. The action of the ejectors will be explained farther on. The crank-arm $D^5$, above referred to, is sleeved upon the ejector-shaft, which is hung in bearings $F^3$, formed in projections or ears on the subtending-arm of the main bracket. This crank-arm has keyed to it at a point midway between its ends one end of a trip-shaft $F^4$, while the opposite end of said trip-shaft is secured to one arm $g$ of a bell-crank lever G, having its fulcrum coincident with the ejector-shaft. The other arm $g'$ of the bell-crank lever is connected by a crank-pin $g^2$ with a slotted bent connecting-rod G′, hereinafter called the "trip-rod," said pin passing through and sliding in the slot of the rod, while the upper or opposite end of said rod is connected with a trip-latch $G^2$, which is sleeved upon a hub on the upper tubular arm of the main bracket that, as already stated, incloses the tyer-shaft. The upper end of the bell-crank is also provided with a headed pin or projection $g^3$, which passes through the eye of and is thus connected to a short pintle $g^4$, playing loosely through a crank-arm $g^5$ on the end of the ejector-shaft, and encircled by a spring $g^6$, confined upon said pintle by a nut and bearing against said nut and crank-arm, the purpose of which connection is to permit the outside trip-finger to yield to the pressure of the grain in resisting and forming the bundle without imparting any movement to the ejector-shaft, said connection serving also as a means to return the trip-finger to its normal position after the operation of the ejectors and during the time when the latter are returning to their first position. The nose of the trip-latch is hooked in order to catch the trip-dog, and through its heel end, to which the trip-rod is connected, as just explained, passes the upper bent end of a rod H, that restores the latch to its normal position, this bent end being secured by nuts $h$ $h'$, and serving as the pivot between the latch and trip-rod. The lower end of the rod H plays through a swiveled eyebolt $h^2$ from an arm $h^3$, rigid with the needle-shaft, and between this bolt and a nut $h^4$ on the rod is seated a coiled spring $h^5$, whereby the rod is permitted to yield before the latch when the latter is positively moved to start the binding devices. When these are once started, the arm $h^3$, with its eyebolt, is carried down by the rocking of the needle-shaft as the binder-arm moves to encircle the gavel, and the rod $i$ thereby held in its depressed position, consequently holding the trip-latch with its terminal hook out of the path of the trip-dog until the band is tied and the binder-arm again recedes.

A crank-arm $h^6$ on the end of the needle-shaft is connected by a pitman H′ with a wrist-pin upon the main gear $H^2$, keyed upon the tyer-shaft. This gear-wheel meshes into a small pinion I, hereinafter styled the "driving-pinion," journaled on the cylindrical inner end of a clutch-sleeve I′, which latter bears upon its outer squared end $i$ the sliding hub $i'$ of a chain or sprocket wheel $I^2$, receiving motion from the harvester to operate the entire binder. This sleeve loosely embraces a shaft $I^3$, supported in bearings $i^2$ $i^3$, formed in lugs projecting from the inner side of the overhanging arm of the main bracket and serving as the packer-shaft. The inner abutting end of the sleeve is formed with a clutch-face, and it is moved automatically into engagement with an opposing clutch-sleeve $I^4$, pinned to the packer-shaft, by means of a coiled spring $i^4$, disposed between its outer end and a nut $i^5$ at the extreme rear end of said shaft.

The sliding sleeve, which, as just intimated, is driven by the chain-wheel, also carries two studs or projections $k$, which at different times are engaged by an anti-friction roller $k'$ on the trip-dog K, which is pivoted upon a lateral pin $k^2$ from a radial arm $k^3$ of the driving-pinion, and the heel of which is arranged to be caught by the terminal hook of the trip-latch, said roller being urged into engagement with one of the studs whenever the dog is released from the latch by means of a spring $k^4$, fastened at one end to an arm $k^5$, secured to the pivot-pin of said dog. During the engagement of either of said studs with the roller on the dog, which follows the actuation of the tripping devices, the driving-pinion I partakes of the rotation of the constantly-driven sleeve I′, upon which it is mounted, and of course imparts motion to the main gear and tyer and needle-shafts and the mechanism which they control. One revolution of the main gear suffices to effect the functions of all the binding devices, and in the latter half of this revolution as the binder-arm recedes the hooked end of the trip-latch is gradually carried down into the path of the trip-dog by the action of the yielding rod-connection between its other end and the eye-bolt that rocks with the needle-shaft, and just at the completion of said revolution and the attendant binding operations the hook will catch and stop the heel of the trip-dog, thus swinging it on its pivot and throwing its roller out of engagement with and out of the path of the studs on the sliding sleeve, thus disconnecting the driving-pinion from said sleeve and bringing it to rest until the tripping devices are again actuated.

While the needle and tying devices are operating the sliding sleeve is held out of engagement with the clutch-sleeve upon the packer-shaft, so that the latter and the packing-fingers operated by it may remain idle; but at the moment the separation takes place between the driving-pinion and sliding sleeve the sleeve is left free to be carried into immediate engagement with the clutch by the force of its spring, thereby again starting the packer-shaft to gather another gavel into the binding-throat. This is accomplished by means of a forked shipper L, pivoted at $l$ to a lug $l'$ from the head of the main bracket, the actuating-arm of said shipper having a roller $l^2$, which travels upon an annular cam-flange $l^3$ on the inner face of the main gear, while its other forked arm embraces the fixed clutch-sleeve on the packer-shaft and is carried by the action of said cam-flange against the inner face of the driving-pinion at the very outset of the revolution of the main gear, and through pressure upon said pinion force the sliding sleeve away from the fixed sleeve and hold it out of engagement therewith until the conclusion of the binding operation, when the cam-flange falls away, releasing the pressure upon the driving-pinion and sliding sleeve and allowing the latter to move into re-engagement with the clutch-sleeve at the moment the ejection of the bound sheaf takes place, as will be noted farther on. The main gear has also upon its inner side a disk M provided with toothed segment $m$. The teeth of said segment gear at the proper time with a small pinion M′, fast to a short shaft $m'$, taking bearing in an offset $m^2$ from the outer lower side of the overhung arm of the main bracket. The disk has at each end of its toothed segment a notch or recess $m^3$, into one of which enters one of the two horns $m^4$ of the pinion as the latter begins to gear with the said segment, while the other enters the further notch upon the escape of the pinion from said segment, as customary in stop-motions to insure accurate action. After such escape of the pinion the said horns come in contact with the plane surface or periphery of said disk during the further revolution of the main gear, holding the pinion motionless. A dog or hook $m^5$, pivoted to a projection on the main bracket, fits or rests upon a squared surface of the shaft $m'$ to more effectively enable the horns to hold the pinion against movement when at rest.

To the crank-arm $m^6$ on the shaft $m'$ is pivoted by a pin and screw-threaded sleeve $m^7$, together with a jam-nut, one end of a link $M^2$, which connects by a curved crank-arm $m^8$ with the ejector-shaft, whereby said shaft will be so actuated as to cause the ejectors to move up and outward through the slotted decking or grain-table, so as to "kick" or throw the bundle off the platform after having been formed and bound and to recede beneath the table after such operation, the pinion M′—the primary moving power of said ejectors—being so adjusted or timed with relation to the toothed segment of the actuating-disk as to cause the ejectors to move toward and to act upon the sheaf when the binder-arm moves away therefrom.

N N′ are the packing-fingers or "packers," which are pointed slightly-curved bars hung about centrally of their lengths upon oppositely-projecting cranks on the packer-shaft, whereby they are given an alternate action in accumulating and packing the grain into the binding-throat as it is received from the harvester preparatory to binding the sheaf. The upper ends or shanks of the packers are longitudinally slotted, as at $n$, and receive guide-pins $n'$ from the arms of a T-bracket $N^2$, the base of which forms the cap of the box that supports the inner end of the packer-shaft, the effect being that the cranks in their revolution impart an orbital movement to the point of each respective packer.

The tyer-frame O is bolted to offsets $o$ $o'$ from the forward end of the overhung arm of the post-frame, the inner offset $o$ being the same which at that end affords the pillow-block for the bearing of the packer-shaft. The base of the T-bracket, besides serving as a cap to this pillow-block, is secured to said tyer-frame and has bolted or fastened to its upper side the inner end of the breast-plate O′, curving outwardly after being so attached and bent about midway of its length from the curve, as at $o^2$, where it is secured to the inner legs of said frame, and thence extending to the outer legs, where it is again secured. Upon the upper side of the inner end of this breast-plate is bolted a cross-bar $O^2$, having forwardly-projecting pendent flexible arms or stiff wires $o^3$, against which the grain primarily accumulates, and from which the packers carry it onward wisp by wisp.

The binding-table is provided at its inner side and in precedence of these wires with inclined notched ledges $o^4$—one on each side of the slot through which the binder-arm passes—to resist the pushing back of the grain as the packers alternately withdraw from operation.

In or about the middle of the breast-plate and opposite the slot in the binding-table is formed the cord-slot, above the rear edge of which is disposed and secured to said plate a flat spring $o^5$, which as the binder-arm passes through said slot cleans the eye portion of said arm and the end of the cord which it carries of any foreign substances or grain that may have adhered thereto.

In operation the grain is delivered upon the binding-table by the harvester and against the retaining springs or wires, the packers acting alternately carry it forward wisp by wisp from these wires and pack it into the binding-throat against the trip-finger and between the table-trip and breast-plate until sufficient has accumulated to the tripping mechanism. When the packers stop, the binding devices simultaneously start, the binder-arm first rising to carry the cord around the gavel, and lifting the table-trip in this movement to give an additional under compression to said gavel, then the knot being tied and severed the binder-arm recedes and the ejectors discharge the bound sheaf; finally, the binding devices being restored to their initial position are thrown out of action and the packers again engaged with the prime driver.

I claim—

1. The combination, substantially as hereinbefore set forth, of the hinged table-trip arranged to actuate the trip-clutch whenever depressed, and mechanism whereby said trip is lifted against the gavel to act as a compressor after the binding mechanism is started.

2. The combination, substantially as hereinbefore set forth, of the hinged table-trip, the trip-arm which it actuates, the binder-arm moving up past said table-trip after the binding mechanism is started, and a lifter upon said binder-arm arranged to come in contact with the under side of the table-trip and lift it to compress the gavel.

3. In a grain-binder, the combination, substantially as hereinbefore set forth, with the binder-arm and its shaft, of the compressor linked to the heel of the binder-tripping finger and operated by rollers on said binder-arm to rise against the gavel and compress it from beneath.

4. In a grain-binder, the combination of the table-trip loosely mounted on a shaft beneath the table, with its front or outer end projecting up through an opening in the table and a link connecting its inner end with the heel of the binder-trip finger, and slotted at its point of connection with said trip-finger to permit a yielding of the latter independent of the table-trip, as and for the purposes set forth.

5. In a grain-binder, the combination, with the packing and binding mechanism, of the curved binder-arm, its supporting-shaft, a tripping-finger loosely mounted on said shaft, a table-trip compressor connected with the heel of said tripping-finger, and mechanism actuated by either the tripping-finger or table-trip to throw the packers out of action previous to the binding of the grain, substantially as and for the purposes set forth.

PETER PAUL COLER.

Witnesses:

JOHN WENKER,

W. D. STACY.